United States Patent
Barnes et al.

(10) Patent No.: US 8,850,485 B2
(45) Date of Patent: Sep. 30, 2014

(54) SYSTEM AND METHOD FOR PROVIDING ENHANCED DATA FOR VISUAL DISPLAYS

(71) Applicants: Irwin N. Barnes, Waban, MA (US); John C. McDonough, Nahant, MA (US); Katelin E. Wahl, Chester, NH (US)

(72) Inventors: Irwin N. Barnes, Waban, MA (US); John C. McDonough, Nahant, MA (US); Katelin E. Wahl, Chester, NH (US)

(*) Notice: Subject to any disclaimer, the term of this patent is extended or adjusted under 35 U.S.C. 154(b) by 0 days.

(21) Appl. No.: 13/663,822

(22) Filed: Oct. 30, 2012

(65) Prior Publication Data

US 2013/0141645 A1 Jun. 6, 2013

Related U.S. Application Data

(60) Provisional application No. 61/567,166, filed on Dec. 6, 2011.

(51) Int. Cl.
| | |
|---|---|
| H04N 5/445 | (2011.01) |
| G06F 3/00 | (2006.01) |
| G06F 13/00 | (2006.01) |
| H04N 21/81 | (2011.01) |
| H04N 21/472 | (2011.01) |
| H04N 21/4725 | (2011.01) |
| H04N 21/2343 | (2011.01) |
| H04N 21/4722 | (2011.01) |
| H04N 21/231 | (2011.01) |

(52) U.S. Cl.
CPC ....... *H04N 5/44582* (2013.01); *H04N 21/8126* (2013.01); *H04N 21/8133* (2013.01); *H04N 21/812* (2013.01); *H04N 21/47205* (2013.01); *H04N 21/4725* (2013.01); *H04N 21/234318* (2013.01); *H04N 21/4722* (2013.01); *H04N 21/23109* (2013.01)
USPC ............................................. 725/51; 725/60

(58) Field of Classification Search
USPC ...................................................... 725/51, 60
See application file for complete search history.

(56) References Cited

U.S. PATENT DOCUMENTS

| | | | |
|---|---|---|---|
| 2002/0062252 A1* | 5/2002 | Van Zoest et al. | 705/14 |
| 2002/0120934 A1 | 8/2002 | Abrahams | |
| 2002/0126990 A1* | 9/2002 | Rasmussen et al. | 386/68 |
| 2003/0110507 A1* | 6/2003 | Dimitrova et al. | 725/110 |
| 2003/0110516 A1* | 6/2003 | Chang et al. | 725/136 |
| 2004/0073493 A1 | 4/2004 | Kato et al. | |

(Continued)

FOREIGN PATENT DOCUMENTS

| | | |
|---|---|---|
| WO | 2009027110 A1 | 3/2009 |
| WO | 2009129345 A1 | 10/2009 |

OTHER PUBLICATIONS

International Search Report and Written Opinion issued in connection with PCT Application No. PCT/US2012/067771, mailed on Feb. 27, 2013.

(Continued)

*Primary Examiner* — Ricky Chin
(74) *Attorney, Agent, or Firm* — Gesmer Updegrove LLP

(57) ABSTRACT

A method and system providing enhanced data for visual displays are provided. A remote selector identifies a plurality of objects and sends at least one request to retrieve data about the objects. A server receives the request from the remote selector and retrieves the data about the objects using one or more unique index keys from a database. A display device displays the data provided by the server, and the data concurrently appears with the objects on the display device.

12 Claims, 9 Drawing Sheets

(56) References Cited

U.S. PATENT DOCUMENTS

| | | | |
|---|---|---|---|
| 2006/0218618 A1* | 9/2006 | Lorkovic | 725/135 |
| 2008/0209480 A1 | 8/2008 | Eide et al. | |
| 2010/0158391 A1 | 6/2010 | Cunningham et al. | |
| 2011/0282734 A1* | 11/2011 | Zurada | 705/14.49 |
| 2011/0321096 A1* | 12/2011 | Landow et al. | 725/41 |
| 2012/0123897 A1* | 5/2012 | Gargiulo | 705/26.5 |
| 2012/0167146 A1* | 6/2012 | Incorvia | 725/60 |

OTHER PUBLICATIONS

Bove, "Adding Hyperlinks to Digital Television" SMPTE—Motion Imaging Journal, Society of Motion Picture and Television Engineers, White Plains, NY, vol. 108, No. 11, Nov. 1, 1999, pp. 795-801.

International Preliminary Report on Patentability issued in connection with corresponding PCT Application No. PCT/US2012/067771, mailed on Jun. 19, 2014.

* cited by examiner

SYSTEM AND METHOD FOR PROVIDING ENHANCED DATA FOR VISUAL DISPLAYS

PRIORITY INFORMATION

This application claims priority from provisional application Ser. No. 61/567,166 filed Dec. 6, 2011, which is incorporated herein by reference in its entirety.

BACKGROUND OF THE INVENTION

The invention is related to the of field visual display systems, and in particular a system and method for providing enhanced data for visual displays. With the rapid advance in science and technology, electronic devices have gained great popularity, and people are becoming more and more dependent on electronic devices such as TV, video recorder/player, and/or multi-media AV device. In order to control electronic devices at a distance from the user, remote control devices are provided for the user to select a corresponding remote control function, such as previous/next channels, adjusting sound volume or switching channels, with the key on the remote control device. For generally known remote control devices, the user remotely controls electronic devices by pressing the keys on the remote control device. Thus, if the user would like to switching channels, adjusting volume or switching to previous/next channels, the user needs to look at the remote control device, select the corresponding of the desired function, and then presses the key to remotely control the electronic device.

SUMMARY OF THE INVENTION

According to one aspect of the invention, there is a method of providing enhanced data for visual displays. The method includes identifying a plurality of objects. The method includes assigning a unique key for each of the objects in a database. The method includes requesting the key from the database. Additionally, the method includes determining data associated with the key. Further, the method includes providing the data to a display device, and the data concurrently appears with the objects on the display device.

According to another aspect of the invention, there is a system of providing enhanced data for visual displays. The system includes a remote selector that identifies a plurality of objects and sends at least one request to retrieve data about the objects. The system includes a server that receives the request from the remote selector and retrieves the data about the objects using one or more unique index keys from a database. Further, the system includes a display device that displays the data provided by the server, and the data concurrently appears with the objects on the display device.

DETAILED DESCRIPTION OF THE INVENTION

It is to be understood that the terminology used herein is for the purpose of describing particular embodiments of the invention only, and is not intended to be limiting.

As will be appreciated by one having ordinary skill in the art, the present invention is directed to a system and method for providing enhanced data for visual displays. By the use of a visual marker that may be activated by a viewer, a pre-programmed database with pre-programmed associations may be invoked to display textual and other data relevant to a person, place or object.

The system uses a preprogrammed database index that associates people, places and objects to the database using a unique index key for each object. The database may make the association of the people, places and objects on TV screens, computer screens and any digital media or display devices. Examples of other implementations include but are not limited to: television shows for sports, movies, TV series, and talk shows, as well as computer displayed screens such as internet displays, including touch screens. If an object is selected on the display device but no unique key has been assigned by the index then a number of steps will be followed to enable services to that object:

1) Best guess for a match based on visual recognition of the object—for instance the blender on the counter in the movie mat be a GE blender, but since GE does not participate in the service, the index and software can suggest they look up a Hamilton Beach blender—this provides the user or viewer with the closet object identification and has the added benefit of providing Hamilton Beach an advertising opportunity even when their product is not in the visual display.

2) Alternate keys approach will try to combine non-exact matches to make a best guess for the object, but has the risk of identifying a hammer as a screwdriver.

Figure 1:
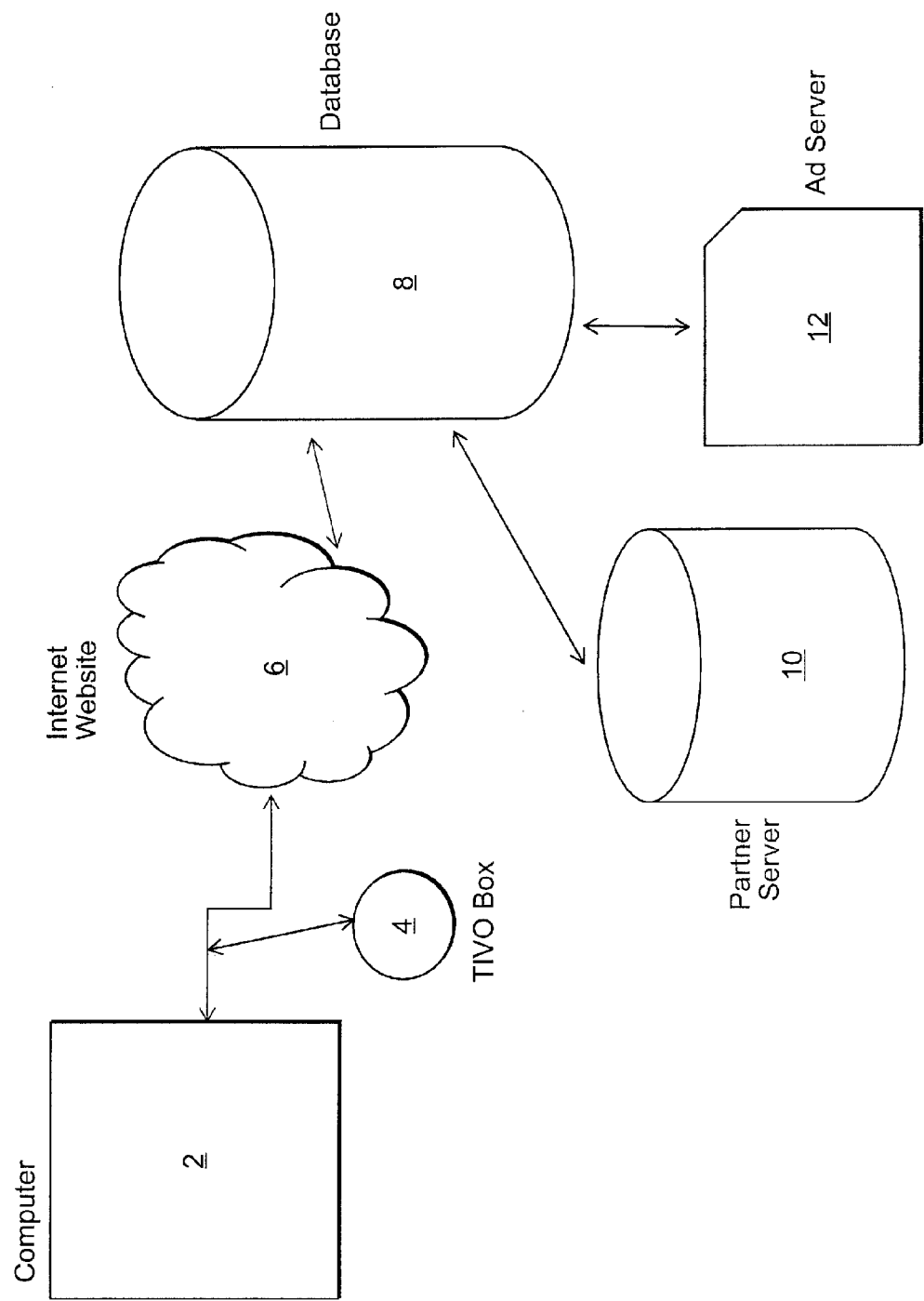
FIG. 1 is an illustrated embodiment of an example of a plurality of servers in communication with a database.

Referring to FIG. 1, a computer or television screen 2 is depicted, where the screen 2 with a movie, TV show or sports show is playing. The screen 2 can be part of a television system having a cable or TIVO box 4 or the screen can be part of a computer system that is internet-enabled where there is no cable or TIVO box 4. After connecting to an internet website 6, the latest information about all products for sale is provided, without having a user to enter such data themselves. It is organized by the manufacturer and mapped to UPC or SKU codes, through a database 8 that is indexed by unique keys for each object and/or person.

For example, one implementation of the invention is a user viewing an online copy of the most recent Best Buy circular (Best Buy may create their circular) and connecting it online to a tagging system or the like for latest information about all the products offered for sale, without having to enter the data themselves. As a result, this turns the Best Buy circular into an online, interactive ad instead of a flat, static online publication. The database 8 is in communication with partner servers 10, such as IMDB or ESPN. Further, the database 8 is in communication with a smart ad server 12, which may display full or mini-commercials or links to web pages.

Figure 2:
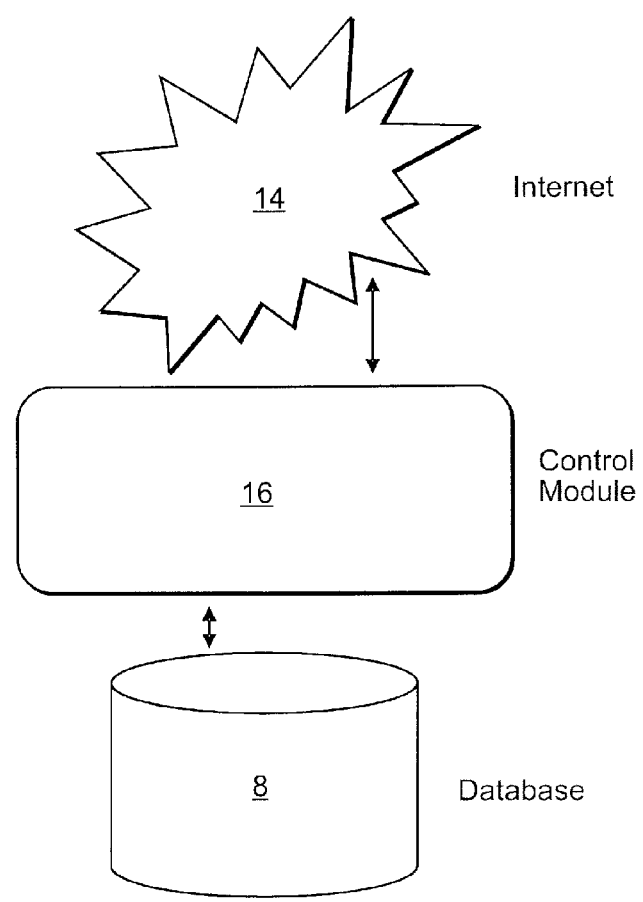
FIG. 2 is an illustrated embodiment of an example of a control module in communication with a database and a cloud.

Referring to FIG. 2, all interfaces are through a cloud or the internet 14. A control module 16 manages all operations between the database 8 and internet/network using a number of interfaces. As will be described in further detail below, the database 8 may be a standard database that is either local or remote; the schema provided in Table 1 is what makes the database 8 unique. The scheme along with decisions rules that can be learned, pre-programmed or edited to create new ones or improve database access rules makes this service novel. Also, the database 8 can be in a cloud based service that can be replicated, backed up and preserved so a future service can be offered to show what the state of the database 8 was some time in the past. A later version of the database 8 can be created by appending or each unique database record key a time stamp, so each time it gets updated, changed or deleted, there is a timestamp—thus allowing the cloud based service to provide a lookup that is current.

Figure 3:
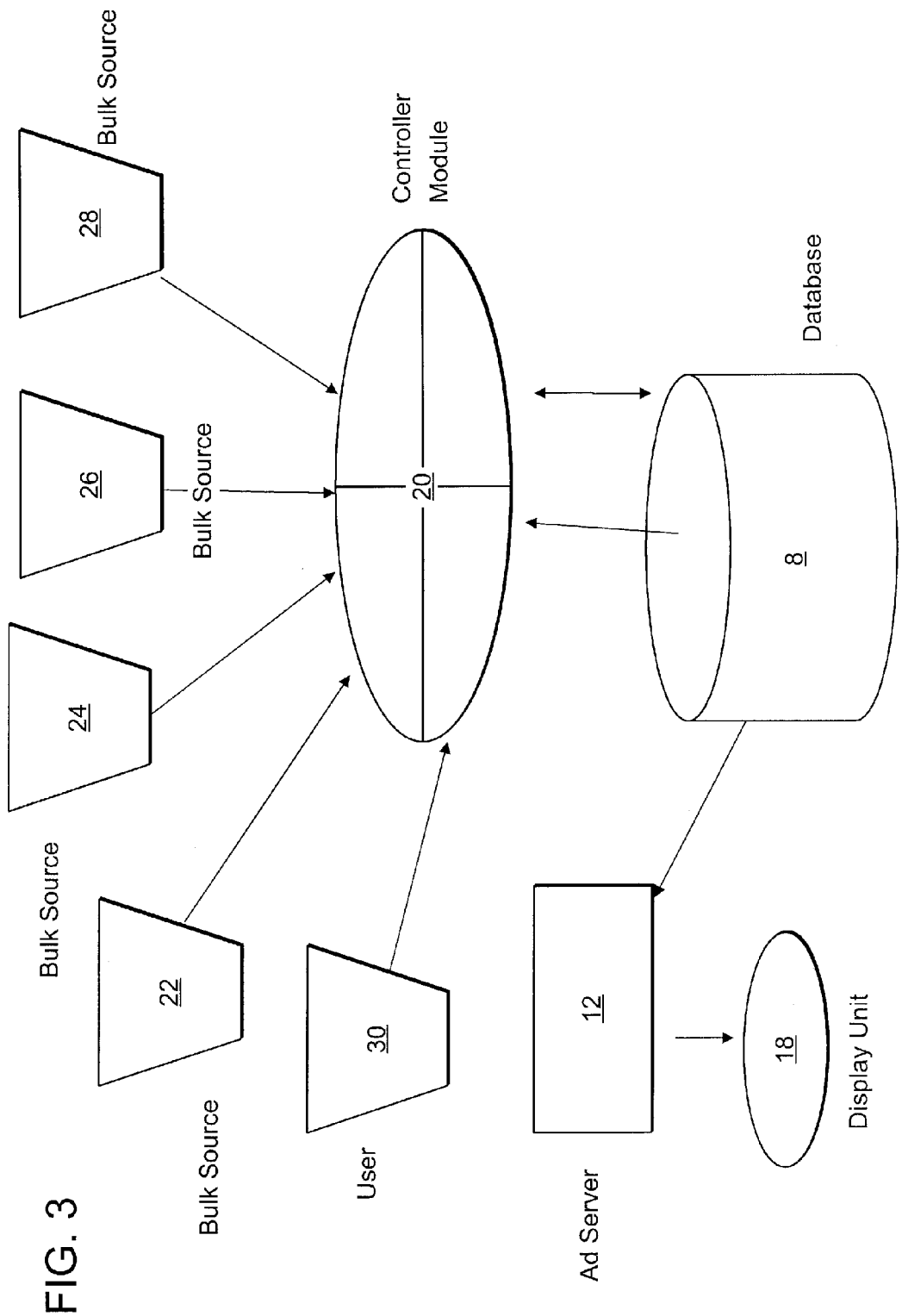
FIG. 3 is an illustrated embodiment of an example of a plurality of databases in communication with a central database.

Referring to FIG. 3, the database 8, which is where input/output operations are performed, is in communication with the ad server 12 and a controller module 20. In addition to the function described above, the ad server 12 is also used to store advertisements that may be used to replace or supplement traditional advertising. The ad server 12 provides a link to a viewing mechanism 18, such as a digital TV, DVD, computer, iPad or tablet. The database 8 is in communication with a controller module 20, which is responsible for at least application program interface (API) processing that ensures the unique key, adding a unique key, eliminating dupes, and adding or updating fields. A plurality of bulk uploads are fed into the controller module 20, such as from Amazon 22, Overstock 24, IMDB 26 and Netflix 28. Additionally, information from a user or operator 30 is fed to controller 20.

People-Focused Implementations

Figure 4:
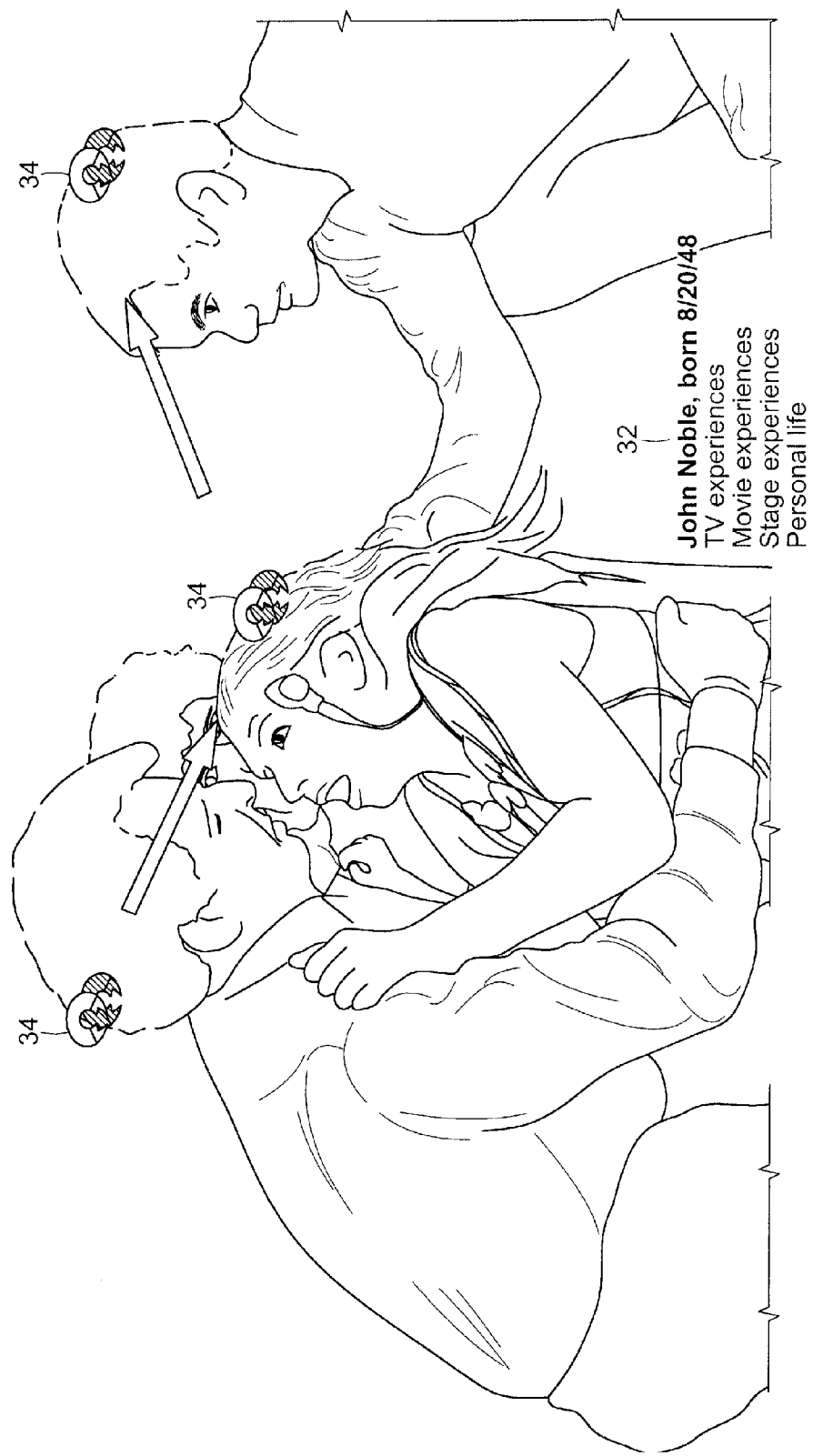
FIG. 4 is an illustrated embodiment of an example of providing identity and background data about a person.
Figure 5:
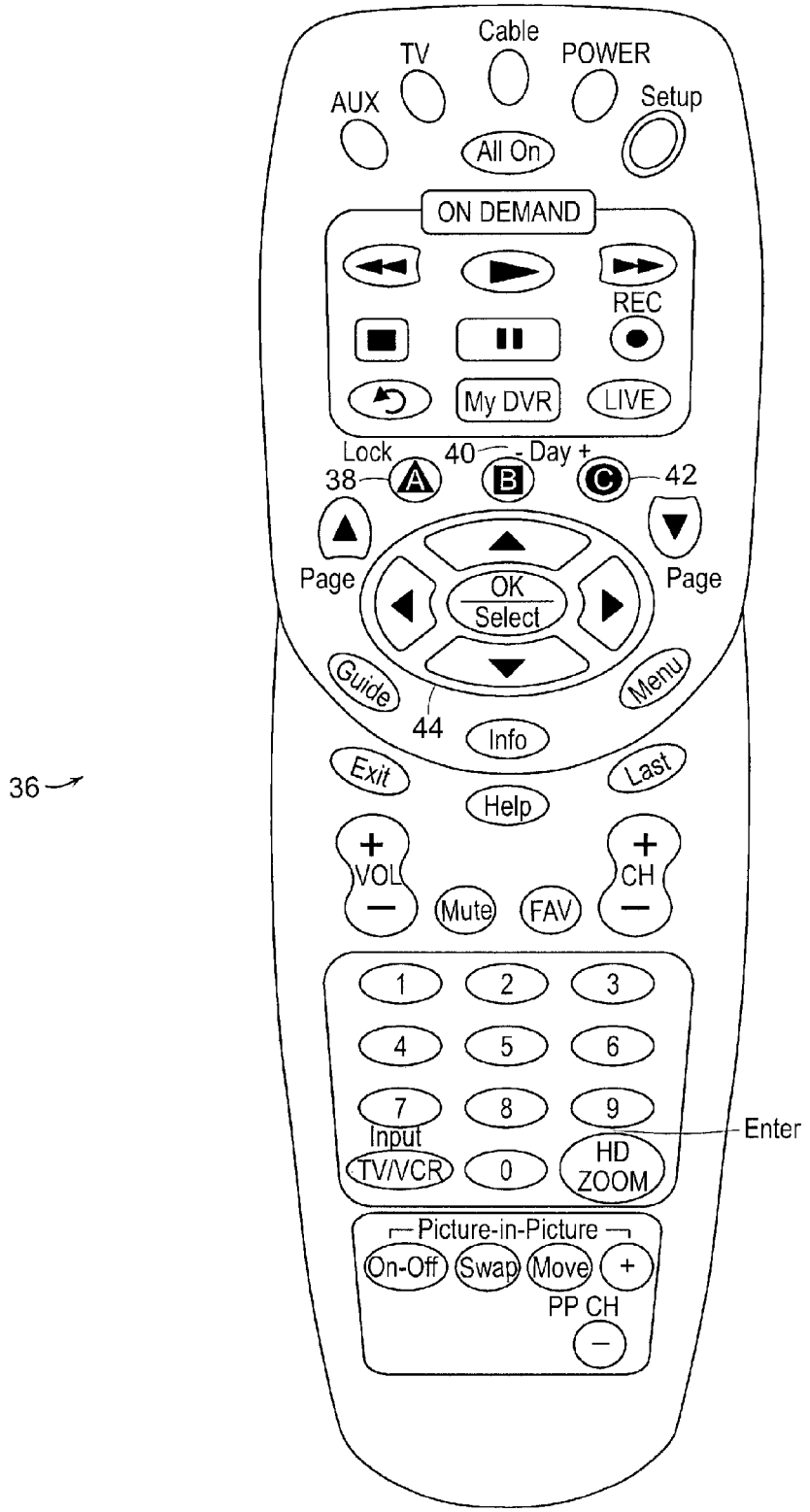
FIG. 5 is a schematic illustration of one embodiment of a remote control depicting a plurality of buttons that serve a plurality of functions.

Referring now to FIG. 4, there is shown an embodiment of a representation of identity and background data 32 about actors on a television show, along with a focus marker 34. As illustrated in FIG. 5, there is shown an embodiment of a representation of a standard remote control 36 that a television viewer may use, where the existing interactive keys on the remote control 36 display identity and background data 32 about the actors on, for example, a television show.

More specifically, those existing interactive A, B and C buttons (38, 40, and 42, respectively) on the remote control 36 may be used to move from object to object or object to person. For example, button A 38 may move a focus marker 34 among people and objects, and button B 40 may launch a data service. In an alternate setup, button A 38 may invoke a focus marker 34, the arrow buttons 44 on the remote control 36 may be used to choose between people and objects on the screen, and button B 40 may launch a data service. Button C 42 may be used to choose among displayed informational topics, as may the arrow buttons 44 on the remote control 36. In addition, a filter may be added which may allow the viewer to determine whether they would like to view people only, objects only, or both.

By accessing existing API https://dev.twitter.com/, one can use the tagged twitter handle of an actor to access his or her twitter stream. The invention allows for merging the twitter handle with a live action movie, or live TV show that includes that person is truly unique. For instance, Brad Pitt may be walking down the Red Carpet at the Academy awards and through the invention one can overlay that live action TV show with his twitter stream by connecting the API to https://twitter.com/bradpittupdates twitter handle and stream those updates. This is a rather elegant merge of the feed from twitter and combined with the novel live matching service described henceforth of the Brad Pitt actor key by looking up in a database the twitter handle—opening a connection to the twitter feed and then displaying it live as an overlay (on top of) the TV show.

Other implementations include sports programs, movies, TV shows, and live news programs to the extent that voice-to-text translation technology may be implemented and associated. For instance, a newscaster may say "Libya—Moammar Gadhafi" and the invention software may associate the text translation of Moammar Gadhafi=P_44129870, which is an index key to the database 8 at the cloud server 14.

Object-Focused Implementations

Using the remote control 36 to launch display of additional data, the TV viewer may launch a pop up display of data, such as the stores an appliance (e.g. a mixer) may be bought at or websites where it may be purchased, along with prices.

Another example is a viewer watching a TV cooking show where a cake is being baked. The cake may be selected to be displayed in a frame(s) of the show—an option that may pop up is the recipe. Further, since baking recipes may require special handling in high altitude, such a recipe may be included to provide bake times tailored to the specific location of the viewer.

Accordingly, this invention may replace traditional advertising. There are many advantages to this new form of advertising placement. First, TV shows may replace lost revenue that is suffered because of time shifting. Secondly, commercials may be updated in real time, because the ads do not reside at the broadcaster—they are presented by an ad server 12 which may provide ad data in text, sound or video formats or a link to another website—all in near real time.

The ads may be served region-specific or even person-specific; for instance, once it is known that the viewer is clicking on a, for example KitchenAid mixer, that is being viewed in the TV show, and an IP address of the viewer is also known, then the product and location of the vendor may be provided. This information may generate results such as price in an area of the viewer, stores in an area of the viewer, or even models specific to an area of the viewer.

If the viewer were viewing a TV show that, for example showed a car chase using a late model or currently available vehicles, for example a BMW 750 chasing a Lexus, a viewer may be interested in further information about the Lexus. The viewer may "select" the Lexus, along with another selection of the location of the viewer (derived by an IP address), where it is possible to deduce that the viewer is in, for example California, and display vehicle information, gas mileage and emission information. The cost of gasoline for a year may be computed by knowing the location of the viewer and the mileage rating of the car.

Enhanced, replacement or derived advertising is a major benefit of this invention, and may possibly generate revenues for broadcasters using the invention.

One example is a TV show, not live, such as a TV series. Display in any scene or frame may include actors, places and objects. For example, a TV show may have, a kitchen scene, and in the scene appears a KitchenAid mixer. Prior to the show being displayed, during post-production, using provided existing video editing software, the object will be assigned an index key associated with the database 8 using the controller 20.

Use of Unique Database Keys

The unique keys are a critical and innovative component of the invention.

The keys may be held in a cloud server 14 for the shared but unique licensees of this invention. The benefits of a centrally assigned unique key are basic: no duplicates accidently assigned, no multiple keys assigned to the same UPC or SKU, or vehicle model, and the shared benefit of licensees of not having to enter the same information over and over again. Table 1 below illustrates a database schema layout, with the associated descriptions and field names for the data. Note that the invention can include a database schema and timestamp arrangement as well for older databases structures.

ized, unique key for each object—assigned using the software. The video editing software may tag the data stream with people, product, key words or script words. In the above example the database is the same large cloud based database that is a major part of the invention, with the defined schema above. Moreover, the term software is used as an example of using existing facial and object recognition software that is enhanced to automatically assign keys and details in the database to video images or digital version of shows or streams and have all objects automatically tagged. When objects are not recognized, human intervention using the same "software" can be required. The existing facial or object recognition software is not part of the invention, modifying it to

TABLE 1

| Data | Description | Column # | Field name |
|---|---|---|---|
| K_090890987A | Server key that is unique and the index to other pointers below than can be used to point or access other database | 1 | Primary_key |
| Mixed or UPC symbol or SKU | Product_id unique | 2 | UPC_SKU |
| Momar kaddifi | People - not unique | 3 | Name |
| Sy19546 | Twitter handle - unique on twitter | 4 | Twitter_id |
| Superman001 | Facebook password - not unique | 5 | FB_psw |
| Momar-kadaffi-libya | IMDB Actor index key - not unique | 6 | Actor_name |
| 031-25-1235 | Social security number - unique | 7 | SSN |
|  | Amazon product key, used to order an object or movie off of Amazon.com. For instance, if this were someone clicking on a kitchen aid mixer that they saw on a cooking show, they then could order it off Amazon without doing an Amazon search | 8 | Alt_key_amazon |
| 98323983982938293 | ICEC_number - this is a number assigned to phones and other electronic equipment, it can be utilized for custom purposes - usually with a phone | 9 | ICEC |
|  | Alternate keys that can be used for lookup, may or may not be unique and may produce multiple results | 10 | Alt_key_2 |
|  | Alternate keys that can be used for lookup, may or may not be unique and may produce multiple results | 11 | Alt_key_3 |
|  | Price_discounted_price_sale_price; this field will hold pricing data for objects, for example a mixer | 12 | Price_data |
| Boston Ma | Location or store location; used to show where the object was seen, such as Boston or the store location it may be bought in | 13 | Location_data |
| Ad for Levi's jeans as worn in TV show being watched live or on DVD or downloaded from iTunes | Advertisement_link, this field can connect the product or object to a video or digital ad, this is a key aspect of the invention as it can replace traditional advertising in TV shows, and also carry forward the option for a person to see advertisements even when the show is on DVD or ITunes format. | 14 | Ad_link |

As an example of a use of this technology, the maker of for example KitchenAid mixers, may request a unique key from the cloud server 14 for its new model of mixer. Then, resellers of that product, such as Sears, KMART, Amazon and Target, may obtain this information from a database server 8, managed and stored in the cloud server 14, which may be accessed in real time or ahead of time.

Tagging System and Software

The centralized database server that is used in post processing of movies, TV shows and the like utilizes a specialrecognize and then assign database keys or associate with the existing database entries is part of the invention.

Another implementation may extend the above capability to magazines online; however, that is not core to this invention.

Figure 6:
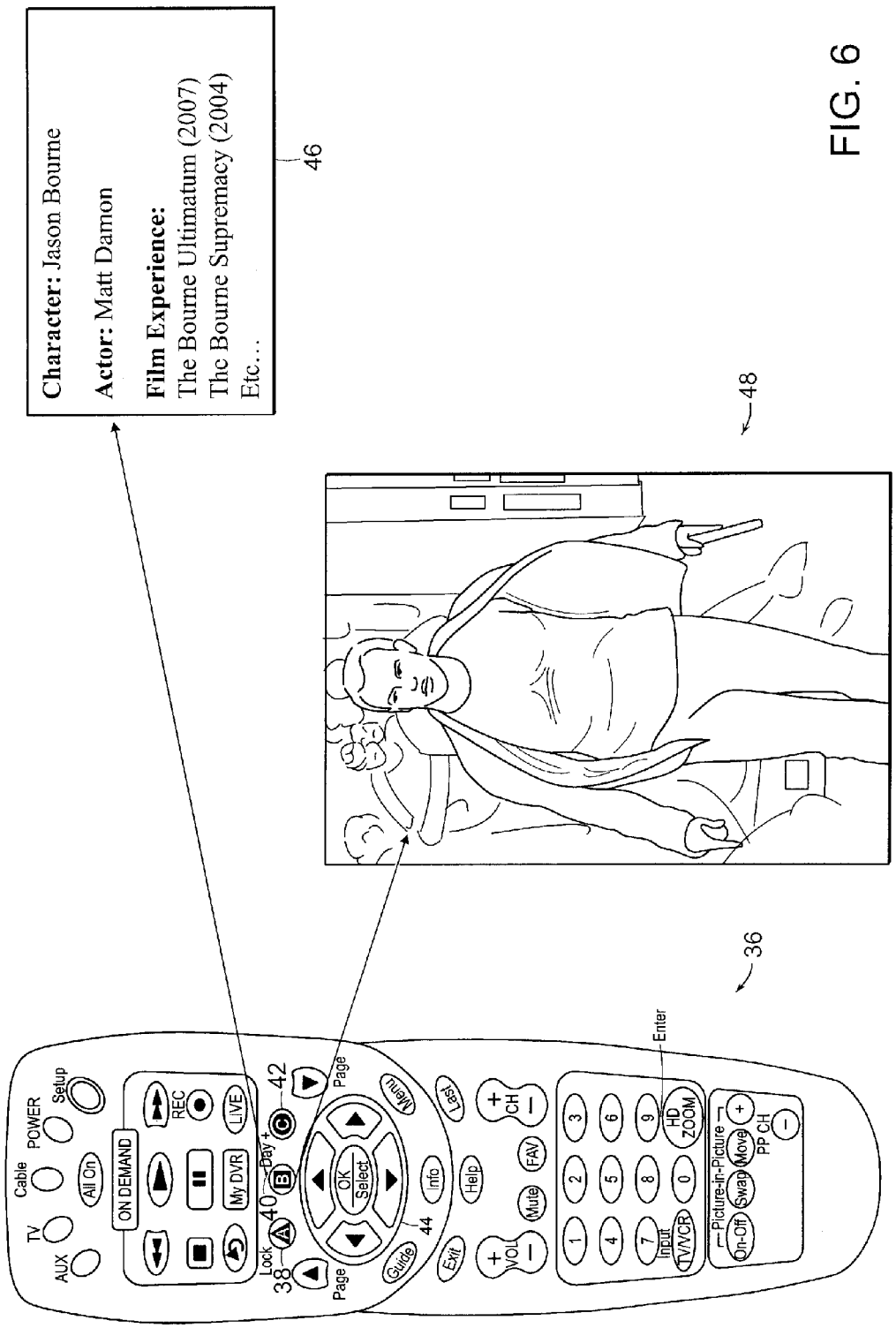
FIG. 6 is a schematic illustration of one embodiment of a plurality of functions performed by a plurality of buttons of a remote control.

Referring to FIG. 6, the viewer may press button A 38 from the remote control 36 and the focus marker 34 will appear above the person in the screen.

Then, the viewer may press button B 40 from the remote control 36, and the details 46 that pop up will show up superimposed over an image 48 of, for example Jason Bourne, next to the actor, or in a corner of the screen.

In another embodiment, the method of control may be through an external device, such as a keyboard. The keyboard may be connected to a computer or a Smart or Internet enabled TV, which may be done via a wireless keyboard that is connected to the TV or computer using Bluetooth or another wireless protocol.

In another embodiment, an implementation of the keyboard may be a virtual keyboard that is displayed on the TV or computer screen and accessed using the remote control 36.

Other implementations of the keyboard function can include using virtual keyboards through a tablet like an iPad, or an Android tablet device, or using an iPhone with the existing interfaces that replicate a full or modified keyboard, iTouch, or other smart phone or smart phone devices that may create and enable a virtual or screen based keyboard.

Database Operations

Database operations are designed to provide a unique database key for each object that is tagged or identified, and to ensure that the same object does not get two keys assigned to it. In the cases where an exact match is not made a series of tests can be done by the software: 1) Best guess for a match based on visual recognition of the object—for instance the blender on the counter in the movie maybe a GE blender, but since GE does not participate in the service, our index and software will suggest they look up a Hamilton Beach blender—this provides the user or viewer with the closet object identification and has the added benefit of providing Hamilton Beach an advertising opportunity even when their product is not in the visual display; and 2) Alternate keys approach will try to combine non-exact matches to make a best guess for the object, but has the risk of identifying a hammer as a screwdriver.

The software tool that runs on a computer, with IOS, Linux, or Windows, that recognizes objects in a video stream or, using a mouse, allows the user or viewer to mark the relative area of the object with mouse clicks. This is not dissimilar to video or photo editing software that allows the user of the software to edit images or objects, for digital enhancement. For the purposes of the software and invention, it adds a unique key column 1 of the database layout above in Table 1—then it may add additional data fields in at least two methods:

Method 1:

A human sitting at the terminal may manually enter every field.

Method 2:

An operator of the software may select, from a drop down list, a related database 8 that contains all the other details. Options and examples include: SKU database, UPC database, Amazon database, Store database (such as Macy's), Overstock.com database.

This may be accomplished by a set of APIs and data transfers done allowing for the storing of information between databases 8 and 22-30. This attribute of the invention is a data conversion and entry method that is proprietary to the invention and the database. Frequent updates can be made to these published data sources using common API's or custom one's built to extract the data and normalize it into the cloud database of this invention.

The database 8 works like a standard, high performance, replicated database in many ways, but the unique ways are as follows:

1. Allow database attributes to be added manually by operator of software mentioned above.

2. Allow singular updates to records from other database sources using custom API's that may be used to seamlessly add many fields about one object, but only for purposes of required operations. For example, the API may add several fields from the IMDB.com database about an actor, but would not at that time include the detailed data about the actor, such as movies, co-stars, date of birth, DOD, birthplace—all that data would be linked over on a per request basis under this invention from IMDB.com.

3. Enable bulk updates of new records from bulk sources. For instance, each day Amazon.com adds many new items, movies or books to its database, the API will enable the updates, additions, deletes and edits in a bulk manner from Amazon.com.

4. Allow editors to edit incorrect entries to the database.

5. Database integrity operations would constantly check all updates and edits to ensure that primary database keys are unique. The updates and edits may be done one at a time by a user or in massive volume by an external provider. For instance, bulk updates may be accepted from Amazon.com and NetFlix on the same day, and both may be trying to add a new movies release, for example "The Greatest Minds of IP". Although it is perfectly acceptable for both Amazon and NetFlix to send this update, the APIs will ensure that only one unique entry is made with two alternate keys—one for Amazon, one for NetFlix.

Process Steps for Database Operations

Figure 7:
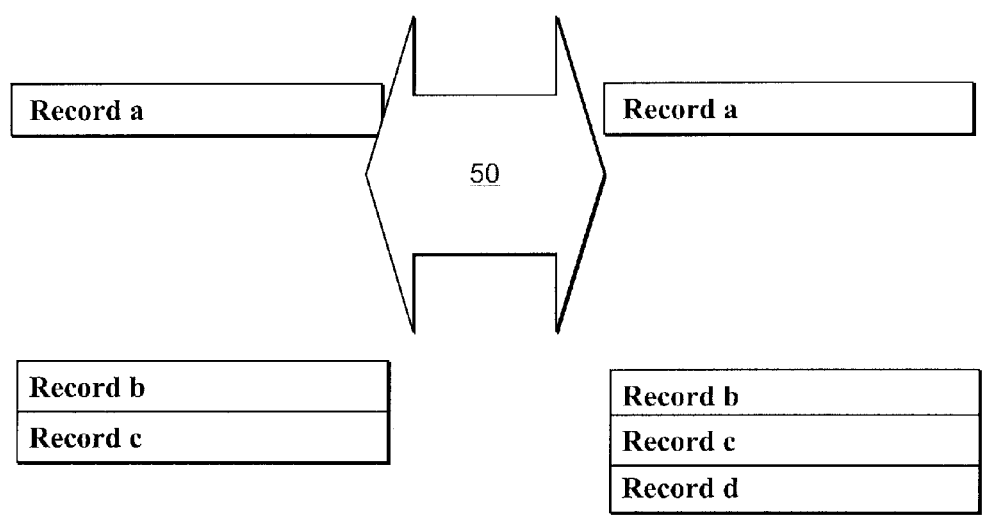
FIG. 7 is an illustrated embodiment of an example of a process to add or insert a record to a database.

Referring to FIG. 7, the following process steps are used for adding or inserting 50 a record:

a. Check field attributes {name, description, price, dob, SKU or UPC). SKU or UPC will suffice most of the time.

b. If the added attempt finds that it is a dupe, it will not add the record—it will be written to a report file for error reporting that may be reviewed by data providers or the human user.

c. If the data record is new and correct, it will be added. The new key is from a store of keys that is held in another file on the database.

Figure 8:
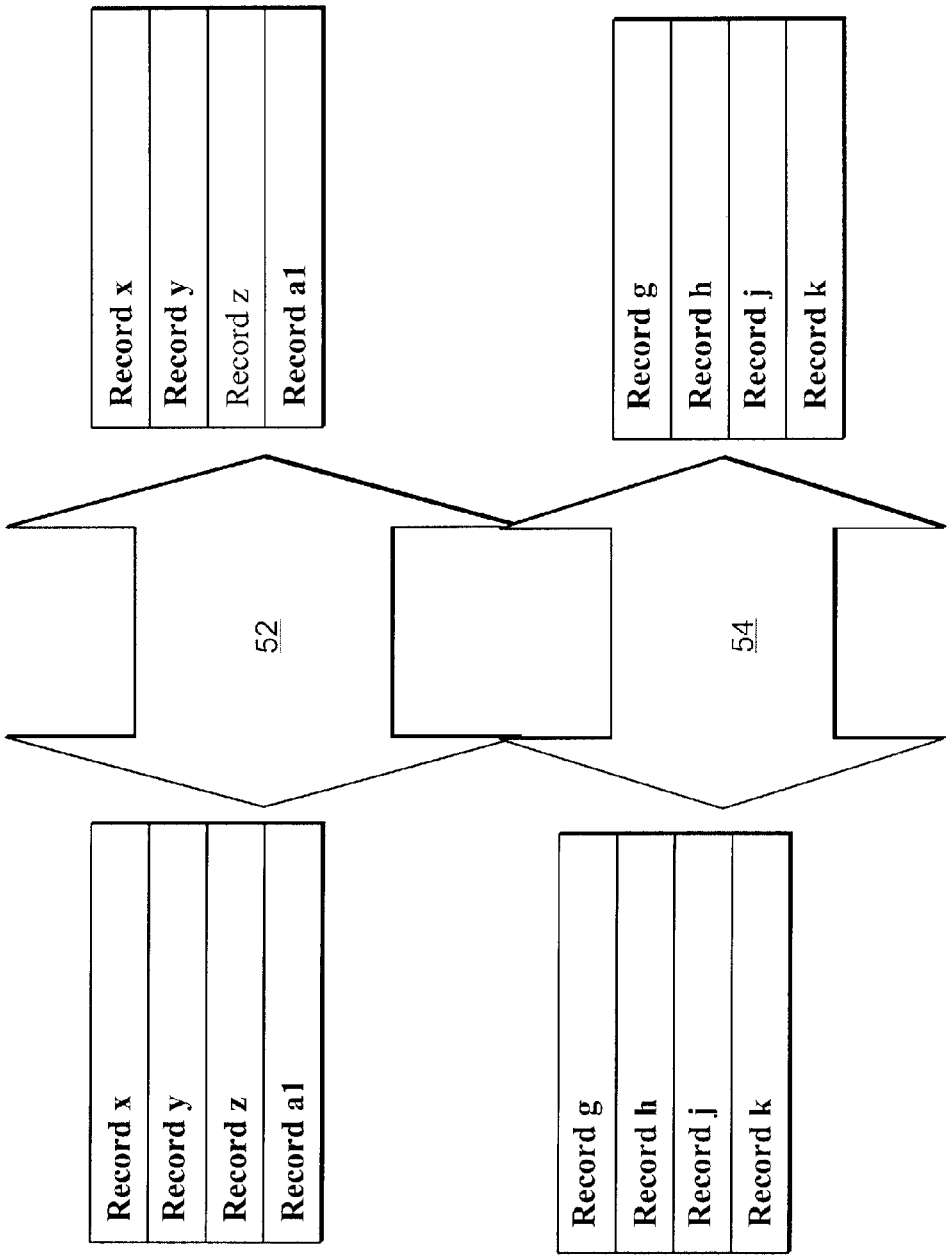
FIG. 8 is an illustrated embodiment of an example of a process to delete a record from a database, and an example of a process to edit a record in a database.

Referring to FIG. 8, the following process steps are used for deleting 52 a record:

a. Delete solely by a match on unique key {See Table 1}.

b. If there is a certain match the record will be deleted from the database by removing the pointers, but not the physical database record; clean-up may occur later.

Referring to FIG. 8, the following process steps are used for editing a record:

a. Verify record match by unique key, or search by alternate key {see Table 1}.

b. Database software uses field name match to update that field with new data.

Figure 9:
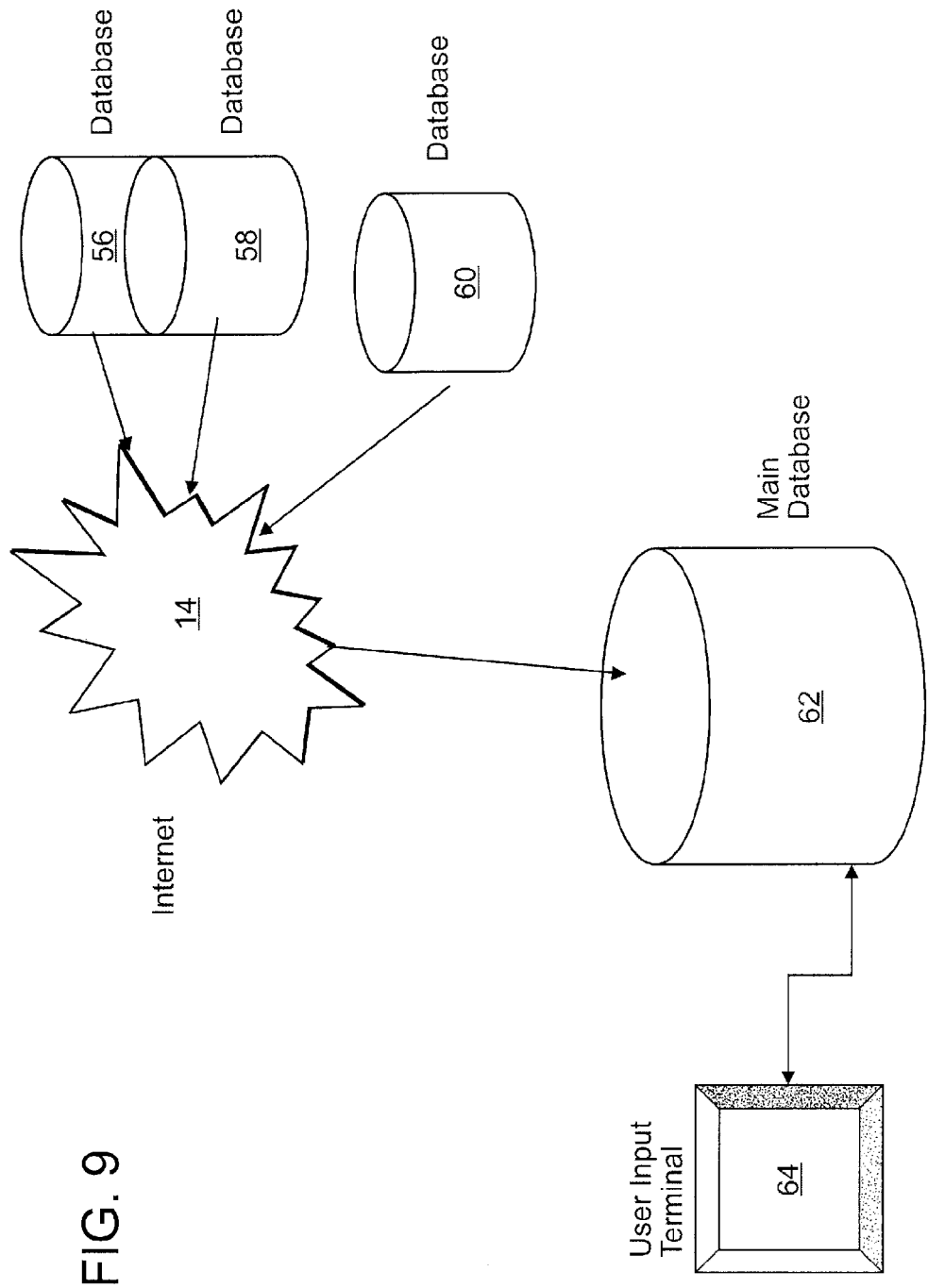
FIG. 9 is an illustrated embodiment of an example of a central database in communication with a plurality of databases and a user input terminal.

Referring to FIG. 9, the following process steps are used for creating ad server data:

a. Used for operations that provide advertising for the object.

b. The ad server data {see Table 1} provides a description and hyperlink to location on the internet of the advertisement. The Amazon database 56, the SKU/UPC database 58, and the IMDB database 60 all communicate with the internet 14, which a main database 62 also communicates with. This database 62, which communicates with a user input terminal 64, has records of the database layout schema provided in Table 1.

All software programs and system applications described herein are platform independent and can execute in any browser such as Firefox®, Internet Explorer®, or Chrome®. The web applicant can also be written in any platform independent-base computer language, such as Java or the like. All software programs and system applications execute on a client computer using a processor or the like. All software programs and system applications can be stored in the RAM or ROM of the client. Furthermore, all software programs and system applications can be stored on an external memory device to be uploaded to the client computer for execution. The elements associated with all software programs and system applications can be executed from the client computer or on a remote server. All database servers can be local on the client computer or on a remote server, as well as on a system remote from either the client computer or remote server. The client computer, remote server, and database servers communicate to each other using known communication protocols, such as TCP/IP.

Although the present invention has been shown and described with respect to several preferred embodiments thereof, various changes, omissions and additions to the form and detail thereof, may be made therein, without departing from the spirit and scope of the invention.

What is claimed is:

1. A method of providing enhanced data for visual displays, comprising the steps of:
   (i) identifying a plurality of objects, through a plurality of buttons of a remote selector wherein said buttons are configured so as to allow control between said objects through a focus marker, wherein said objects comprises a plurality of visual representations from a sports program, a movie, a TV show, or a news program;
   (ii) assigning at least one unique index key for each of said objects in a database, each of said objects are mapped to a plurality of universal product (UPC) codes or stock keeping unit (SKU) codes, and the database is indexed by the at least one unique index key while ensuring a single unique index key is assigned to each of said objects using an application programming interface (API), the API allows for database integrity operations to be performed across a plurality of databases by checking each time an object is identified and assigned an index key whether the primary database keys are unique, the unique index keys is used to identify and reference one or more of the objects that is to be displayed on a display device while in use;
   (iii) requesting said key from said database,
   (iv) determining data associated with said key, and
   (v) displaying said data to the display device, said data concurrently appears with said objects on said device by referencing one or more of the unique index keys when said objects are accessed via said display device a determination is made as to whether it is assigned said one or more unique index keys, if said objects are assigned with the one or more index keys, information related to said objects are retrieved from said database using said one or more unique index keys, if said objects are not assigned said one or more unique keys, facial or object recognition is used to identify said objects and one or more respective unique index keys are assigned to them.

2. The method of claim 1, wherein said data comprises identity and background information.

3. The method of claim 1, further comprising providing an advertisement server that provides advertisement data in text, sound or video formats, or a link to a website, said advertisement server communicates with said database.

4. The method of claim 1, wherein determining data associated with said key comprises voice-to-text translation technology.

5. The method of claim 1, wherein said data comprises information that is specific to a region, said information comprising at least one price of said product that is specific to said region, the availability of said product in at least one store that is specific to said region, and the availability of at least one model that is specific to said region.

6. The method of claim 1, wherein said data is obtained from a plurality of sources.

7. A system for providing enhanced data for visual displays, comprising:
   a remote selector that identifies a plurality of objects through a plurality of buttons wherein said buttons are configured so as to allow control between said objects through a focus marker, and sends at least one request to retrieve data about said objects, wherein said objects comprises a plurality of visual representations from a sports program, a movie, a TV show, or a news program;
   a server that receives said request from said remote selector and retrieves said data about said objects using one or more unique index keys from a database, each of said objects are mapped to a plurality of universal product (UPC) codes or stock keeping unit (SKU) codes, and the database is indexed by the at least one unique index key while ensuring a single unique index key is assigned to each of said objects using an application programming interface (API), the API allows for database integrity operations to be performed across a plurality of databases by checking each time an object is identified and assigned an index key whether the primary database keys are unique, the unique index key is used to identify and reference one or more of the objects that is to be displayed, and
   a display device that displays said data provided by said server, said data concurrently appears with said objects on said display device by referencing one or more of the unique index keys, when said objects are accessed via said display device a determination is made as to whether it is assigned said one or more unique index keys, if said objects are assigned with the one or more index keys, information related to said objects are retrieved from said database using said one or more unique index keys, if said objects are not assigned said one or more unique keys, facial or object recognition is used to identify said objects and one or more respective unique index keys are assigned to them.

8. The system of claim 7, wherein said data comprises identity and background information.

9. The system of claim 7, further comprising an advertisement server that provides advertisement data in text, sound or video formats, or a link to a website, said advertisement server communicates with said database.

10. The system of claim 7, wherein said server comprises voice-to-text translation technology.

11. The system of claim 7, wherein said data comprises information that is specific to a region, said information comprising at least one price of said product that is specific to said region, the availability of said product in at least one store that is specific to said region, and the availability of at least one model that is specific to said region.

12. The system of claim 7, wherein said data is obtained from a plurality of sources.

* * * * *